(12) United States Patent
Lee et al.

(10) Patent No.: US 11,851,047 B2
(45) Date of Patent: Dec. 26, 2023

(54) HYBRID ELECTRIC VEHICLE AND CATALYST HEATING CONTROL METHOD THEREFOR

(71) Applicants: Hyundai Motor Company, Seoul (KR); Kia Corporation, Seoul (KR)

(72) Inventors: Jea Mun Lee, Incheon (KR); Joon Young Park, Seoul (KR); Ji Hoon Kang, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 55 days.

(21) Appl. No.: 17/541,564

(22) Filed: Dec. 3, 2021

(65) Prior Publication Data

US 2022/0176942 A1 Jun. 9, 2022

(30) Foreign Application Priority Data

Dec. 3, 2020 (KR) ........................ 10-2020-0167527

(51) Int. Cl.
*B60W 20/16* (2016.01)
*F01N 3/20* (2006.01)
(Continued)

(52) U.S. Cl.
CPC ......... *B60W 20/16* (2016.01); *B01D 53/9495* (2013.01); *B60W 10/06* (2013.01);
(Continued)

(58) Field of Classification Search
CPC ...... F01N 3/0871; F01N 3/101; F01N 3/2006; F01N 3/2013; F01N 5/00; F01N 5/02; F01N 5/04; F01N 9/002; F01N 11/002; F01N 11/005; F01N 2250/04; F01N 2250/06; F01N 2430/02; F01N 2430/04; F01N 2430/06; F01N 2590/11; F01N 2900/04; F01N 2900/0402; F01N 2900/0408; F01N 2900/0412; F01N 2900/0418; F01N 2900/0602; F01N 2900/1602; F01N 2900/1631; B60W 20/16; B60W 10/06;
(Continued)

(56) References Cited

U.S. PATENT DOCUMENTS

2005/0262827 A1* 12/2005 Ichimoto ............... F02D 41/221
60/285
2010/0126142 A1* 5/2010 Murata ................... B60L 58/12
60/299

(Continued)

*Primary Examiner* — Binh Q Tran
(74) *Attorney, Agent, or Firm* — Fox Rothschild LLP (57) ABSTRACT

A hybrid electric vehicle and a catalyst heating control method are configured to select a point in time at which catalyst heating control is performed and to perform a follow-up measure based on the selected point in time. The catalyst heating control method includes performing mode switching from a first mode in which only a drive motor is used as a driving source to a second mode in which an engine is driven in a state in which a drive shaft and the engine are disconnected from each other to start heating of a catalyst of the engine. When demand torque higher than a maximum output of the drive motor occurs before the catalyst heating is completed, the second mode is maintained until the demand torque is greater than the sum of the maximum output and a predetermined margin.

19 Claims, 8 Drawing Sheets

(51) Int. Cl.
    *B01D 53/94*     (2006.01)
    *B60W 10/06*     (2006.01)
    *B60W 10/08*     (2006.01)
    *B60W 20/40*     (2016.01)
    *F01N 11/00*     (2006.01)
    *F01N 9/00*     (2006.01)
    *B60W 20/10*     (2016.01)
    *B60W 20/20*     (2016.01)
    *B60W 20/11*     (2016.01)

(52) U.S. Cl.
    CPC ............ B60W 10/08 (2013.01); B60W 20/40 (2013.01); F01N 3/2013 (2013.01); *B60W 20/10* (2013.01); *B60W 20/11* (2016.01); *B60W 20/20* (2013.01); *F01N 3/2006* (2013.01); *F01N 9/005* (2013.01); *F01N 11/002* (2013.01); *F01N 11/005* (2013.01); *F01N 2430/02* (2013.01); *F01N 2430/04* (2013.01); *F01N 2430/06* (2013.01); *F01N 2590/11* (2013.01); *F01N 2900/04* (2013.01); *F01N 2900/0408* (2013.01); *F01N 2900/0412* (2013.01); *F01N 2900/0418* (2013.01); *F01N 2900/1602* (2013.01)

(58) Field of Classification Search
    CPC ...... B60W 10/08; B60W 10/24; B60W 10/26; B60W 20/40; B60W 2050/146; B60W 2510/068; B60W 2530/12; B60W 2540/10; B60W 10/02; B60W 10/11; B60W 20/10; B60W 20/11; B60W 20/20; B60W 20/00; B60W 20/15; B60W 50/14; B60W 2050/143; B60K 6/42; B60K 6/44; B60K 6/442; B60K 6/445; B60K 6/448; B60K 6/387; B60K 2006/4825; B60Y 2300/474; B01D 53/9495; F02D 41/008; F02D 41/0085; F02D 41/0087; F02D 41/024; F02D 2200/10; F02D 2200/1002; F02D 2200/1004; F02D 2200/1006; F02D 2250/18; F02D 2250/21; F02D 2250/24; F02D 2250/26

See application file for complete search history.

(56) References Cited

U.S. PATENT DOCUMENTS

| | | | |
|---|---|---|---|
| 2012/0072063 A1* | 3/2012 | Kato | B60W 10/26 180/65.265 |
| 2019/0168616 A1* | 6/2019 | Morisaki | B60W 50/0097 |
| 2019/0234367 A1* | 8/2019 | Pursifull | F02D 41/0002 |
| 2019/0366827 A1* | 12/2019 | Tsuchiyama | B60L 1/02 |
| 2020/0049085 A1* | 2/2020 | Kuroda | F01N 3/021 |

* cited by examiner

HYBRID ELECTRIC VEHICLE AND CATALYST HEATING CONTROL METHOD THEREFOR

CROSS-REFERENCE TO RELATED APPLICATION

This application claims under 35 U.S.C. § 119(a) the benefit of Korean Patent Application No. 10-2020-0167527, filed on Dec. 3, 2020, the entire contents of which are incorporated by reference herein.

BACKGROUND

(a) Technical Field

The present disclosure relates to a hybrid electric vehicle capable of selecting a point in time at which catalyst heating control is to be performed and performing a follow-up measure based on the selected point in time and a catalyst heating control method therefor.

(b) Description of the Related Art

A hybrid electric vehicle (HEV) has both an internal combustion engine (also referred to as an engine) and a drive motor and is capable of selectively controlling a power source that generates driving force depending on a driving environment.

However, it is preferable for the engine to be used as the power source when the temperature of a catalyst is equal to or higher than an activation temperature in order to satisfy exhaust gas emission standards and protect the environment. For example, the catalyst has an exhaust gas purification function when the catalyst temperature is equal to or higher than 300° C.; however, the catalyst temperature must be 450° C. or higher in order for the catalyst to exhibit normal efficiency. In general, however, the engine is not provided with a separate catalyst heating (CH) means, and the catalyst is heated through operation of the internal combustion engine. When the catalyst is heated in the hybrid electric vehicle, idle RPM of the engine may be increased so as to be higher than ordinary idle RPM, an ignition angle may be delayed, and fuel consumption may be increased (i.e., fuel pressure may be increased). Catalyst heating (CH) control, which is performed to rapidly increase temperature, is different from a general engine control configuration in consideration of efficiency and output. Consequently, the point in time at which catalyst heating control is started is very important.

Figure 1:
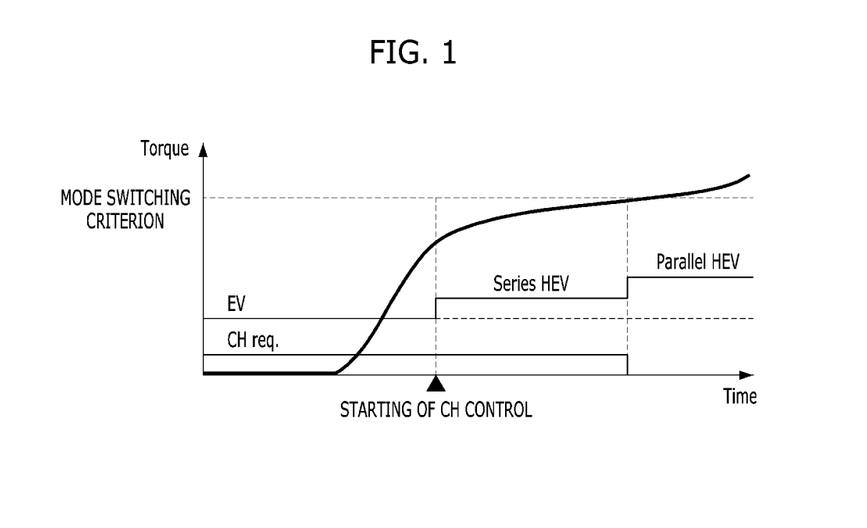
FIG. 1 (RELATED ART) shows an example of a situation in which catalyst heating control is started at an ideal point in time.

FIG. 1 (RELATED ART) shows an example of a situation in which catalyst heating control is started at an ideal point in time.

Referring to FIG. 1, initial temperature of a catalyst is lower than an activation temperature, and therefore it is necessary to heat the catalyst (CH req.). When the catalyst is not immediately heated and the point in time of CH control is selected such that catalyst heating control is finished at the point in time at which demand torque reaches a mode switching criterion, however, it is not necessary to drive an engine simultaneously with HEV ready and exhaust gas emission standards may be satisfied.

Actually, however, it is difficult to predict the point in time at which the engine is used, starting of the engine is on and catalyst heating control is immediately performed regardless of driver demand in an HEV ready state (corresponding to IG on for a general vehicle). At this time, the output of the engine during catalyst heating control is generally minimized until there is driver demand power exceeding a driving mode switching criterion such that the output of the engine is not transmitted to a drive shaft (e.g., a series HEV mode of a parallel type hybrid electric vehicle), although there may be a difference depending on the construction of a powertrain.

Among driving modes, there is an electric vehicle (EV) priority mode, in which driving using only the drive motor is performed first regardless of fuel efficiency. When the EV priority mode and the catalyst heating (CH) control are simultaneously performed, however, catalyst heating control is performed first. The reason will be described with reference to FIG. 2.

Figure 2:
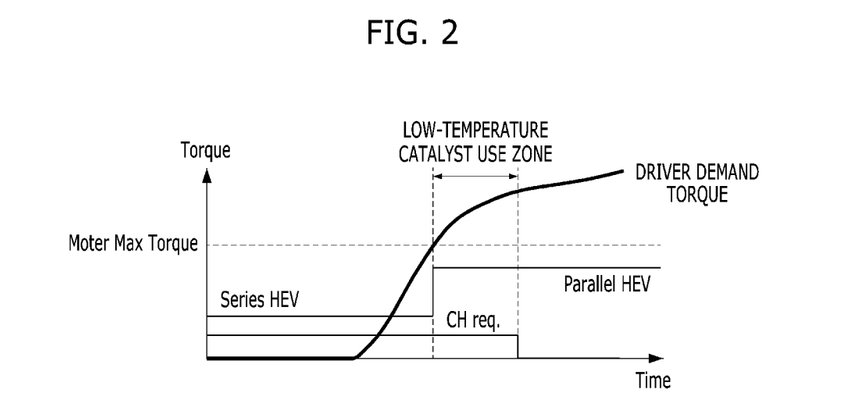
FIG. 2 (RELATED ART) shows an example of a situation in which catalyst heating control is started late.

FIG. 2 (RELATED ART) shows an example of a situation in which catalyst heating control is started late.

Referring to FIG. 2, driver demand torque exceeds the maximum torque of the motor before catalyst heating control is completed for the reason of delaying catalyst heating control in the EV priority mode. In this case, switching to a driving mode in which the engine is used as a driving source (e.g., a parallel HEV mode of the parallel type hybrid electric vehicle) is performed even though the catalyst temperature does not reach the activation temperature, whereby the engine is driven in a low-temperature catalyst zone, and therefore exhaust performance is deteriorated.

Other problems depending on the point in time of catalyst heating control will be described with reference to FIGS. 3 and 4.

Figure 3:
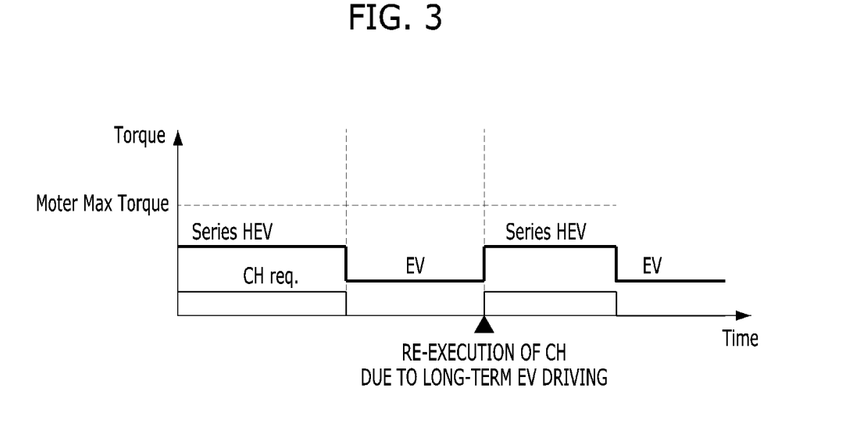
FIG. 3 (RELATED ART) shows an example of a situation in which loss occurs due to catalyst heating control caused as a result of driving using only a drive motor being lengthened.
Figure 4:
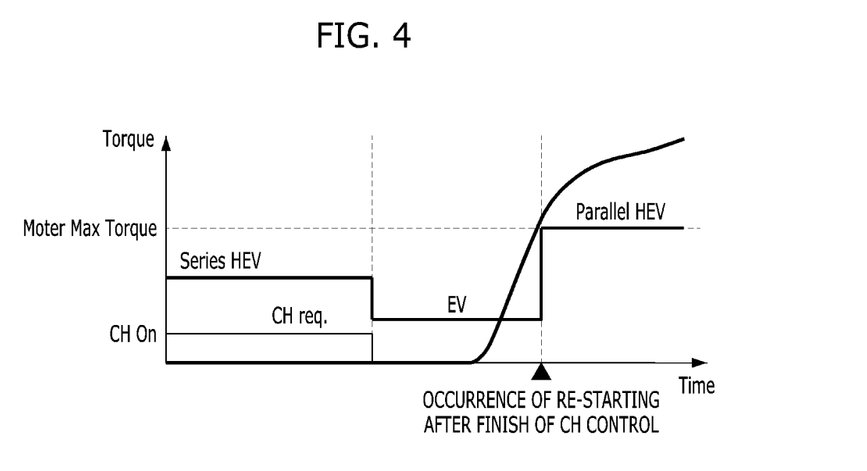
FIG. 4 (RELATED ART) shows an example of a situation in which a phenomenon of repetition of unnecessary starting occurs.

FIG. 3 (RELATED ART) shows an example of a situation in which loss occurs due to catalyst heating control caused as a result of driving using only the drive motor being lengthened, and FIG. 4 (RELATED ART) shows an example of a situation in which a phenomenon of repetition of unnecessary starting occurs.

Referring to FIG. 3, when the driver demand torque is less than the maximum motor torque (Motor Max Torque), catalyst heating control is periodically performed even though it is not necessary to use the engine as the driving source, whereby fuel is lost.

In addition, referring to FIG. 4, the engine is turned off as a result of catalyst heating control being completed (switching to the EV mode); however, the engine is turned on due to an increase in demand torque a while after the engine is turned off, whereby a starting repetition phenomenon (busy on/off) occurs.

Therefore, a catalyst heating control method capable of preventing unnecessary engine starting or repetitive engine starting is required.

SUMMARY

An object of the present disclosure is to provide a hybrid electric vehicle capable of determining an appropriate point in time of catalyst heating and a catalyst heating control method therefor.

Another object of the present disclosure is to provide a hybrid electric vehicle capable of performing an effective follow-up measure when prediction of the determined point in time of catalyst heating fails and a catalyst heating control method therefor.

Objects of the present disclosure devised to solve the problems are not limited to the aforementioned object, and other unmentioned objects will be clearly understood by those skilled in the art based on the following detailed description of the present disclosure.

To achieve these objects and other advantages and in accordance with the purpose of the disclosure, as embodied and broadly described herein, a catalyst heating control method of a hybrid electric vehicle may include performing mode switching from a first mode in which only a drive motor is used as a driving source to a second mode in which an engine is driven in the state in which a drive shaft and the engine are disconnected from each other to start heating of a catalyst of the engine and, when demand torque higher than the maximum output of the drive motor occurs before the catalyst heating is completed, maintaining the second mode until the demand torque is greater than the sum of the maximum output and a predetermined margin.

In another aspect of the present disclosure, a hybrid electric vehicle may include a drive motor, an engine, and a control unit configured to perform control such that mode switching is performed from a first mode in which only the drive motor is used as a driving source to a second mode in which the engine is driven in the state in which a drive shaft and the engine are disconnected from each other to start heating of a catalyst of the engine and, when demand torque higher than the maximum output of the drive motor occurs before the catalyst heating is completed, the second mode is maintained until the demand torque is greater than the sum of the maximum output and a predetermined margin.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DISCLOSURE

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Reference will now be made in detail to the preferred embodiments of the present disclosure, examples of which are illustrated in the accompanying drawings. The following embodiments are given by way of example in order to enable those skilled in the art to fully understand the idea of the present disclosure. Therefore, the present disclosure is not limited by the following embodiments, and may be realized in various other forms. In order to clearly describe the present disclosure, parts having no relation with the description of the present disclosure have been omitted from the drawings. Wherever possible, the same reference numerals will be used throughout the specification to refer to the same or like parts.

Prior to describing a vehicle according to an embodiment of the present disclosure and a method of controlling the same, the structure of a hybrid electric vehicle (HEV) applicable to embodiments and a control system thereof will be described.

Figure 5:
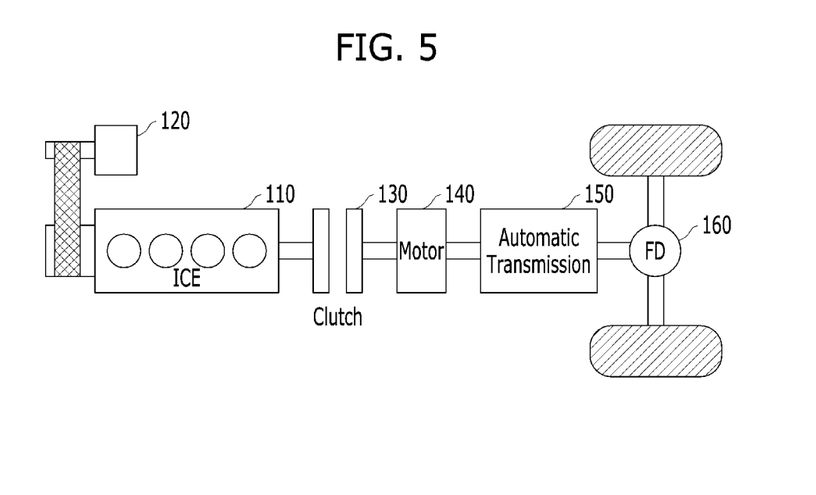
FIG. 5 shows an example of a powertrain structure of a parallel type hybrid electric vehicle applicable to embodiments of the present disclosure.

FIG. 5 shows an example of a powertrain structure of a parallel type hybrid electric vehicle applicable to embodiments of the present disclosure.

Referring to FIG. 5, a powertrain of a hybrid electric vehicle adopting a parallel type hybrid system including a drive motor 140 and an engine clutch (EC) 130 mounted between an internal combustion engine (ICE) 110 and a transmission 150 is shown.

Generally, in such a vehicle, when a driver steps on an accelerator after starting, the motor 140 is driven using electric power of a battery in a state in which the engine clutch 130 is open, and power of the motor is transmitted to wheels via the transmission 150 and a final drive (FD) 160, whereby the wheels are moved (i.e., an EV mode). When the vehicle is slowly accelerated and greater drive force is necessary, a starter generator motor 120 may be operated to drive the engine 110.

When the difference in rotational speed between the engine 110 and the motor 140 is within a predetermined range, the engine clutch 130 is locked up, whereby the engine 110 and the motor 140 drive the vehicle together or the engine 110 drives the vehicle (i.e., transition from the EV mode or an HEV mode). When a predetermined engine off condition, such as vehicle deceleration, is satisfied, the engine clutch 130 is opened, and the engine 110 is stopped (i.e., transition from the HEV mode or the EV mode). Also, in the hybrid electric vehicle, driving force of the wheels at the time of braking may be converted into electrical energy, and the battery may be charged with the electrical energy, which is called regeneration of braking energy or regenerative braking.

When the engine is started, the starter generator motor 120 performs the function of a starter motor. After the engine is started or when the engine is off and rotational energy of the engine is collected, the starter generator motor 120 operates as a generator. For these reasons, the starter generator motor 120 may be called a "hybrid starter generator (HSG)" or may also be called an "auxiliary motor" depending on circumstances.

Hereinafter, driving modes of the hybrid electric vehicle based on the above structure will be described in more detail.

The EV mode is mainly applied to a situation in which speed is low and demand torque is low. In the EV mode, the engine clutch 130 is open and torque is transmitted to the wheels using only the motor 140 as a power source.

The HEV mode is mainly applied to a situation in which speed is high and demand torque is high. In the HEV mode, the engine 110 and the motor 140 are used as power sources. This mode may be divided into a series HEV mode or a parallel HEV mode. In the series HEV mode, the engine clutch 130 is open (i.e., the engine 110 and a drive shaft are disconnected from each other), power of the engine 110 is used by the HSG 120 for power generation, and only the motor 140 directly generates driving force. In the parallel HEV mode, by contrast, the engine clutch 130 is locked up, whereby driving force of the engine 110 and driving force of the motor 140 are transmitted to the wheels.

When catalyst heating (CH) control is performed, as previously described, the engine may be driven in the series HEV mode, and charge power of the HSG 120 may be set to 0 in order to minimize engine output in a catalyst non-activation zone.

Figure 6:
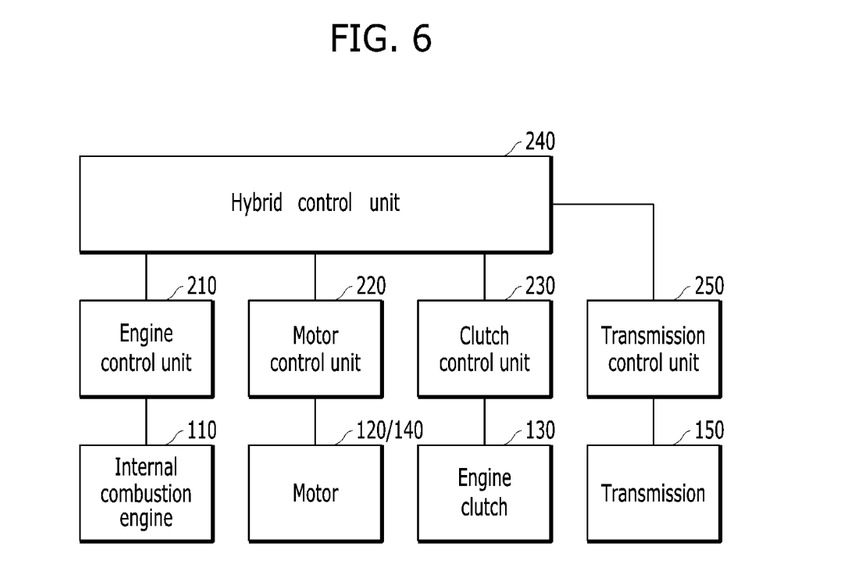
FIG. 6 is a block diagram showing an example of a control system of a hybrid electric vehicle to which embodiments of the present disclosure are applicable.

FIG. 6 is a block diagram showing an example of a control system of the hybrid electric vehicle to which embodiments of the present disclosure are applicable.

Referring to FIG. 6, in the hybrid electric vehicle to which embodiments of the present disclosure are applicable, the internal combustion engine 110 may be controlled by an engine control unit 210, torque of the starter generator motor 120 and the drive motor 140 may be controlled by a motor control unit (MCU) 220, and the engine clutch 130 may be controlled by a clutch control unit 230. Here, the engine control unit 210 is also called an engine management system (EMS). In addition, the transmission 150 is controlled by a transmission control unit 250.

Each control unit may be connected to a hybrid control unit (HCU) 240, which is a superordinate thereof and which overall controls a mode switching process, may perform driving mode switching, may provide information necessary to control the engine clutch at the time of gear shift and/or information necessary to control engine stop to the hybrid control unit 240 under control of the hybrid control unit 240, or may perform operation based on a control signal.

For example, the hybrid control unit 240 determines whether to switch between the EV mode and the HEV mode depending on a driving state of the vehicle. To this end, the hybrid control unit determines the point in time of opening of the engine clutch, and performs hydraulic control (for a wet type engine clutch) or torque capacity control (for a dry type engine clutch) at the time of opening of the engine clutch. In addition, the hybrid control unit 240 may determine a state (lock-up, slip, or open) of the engine clutch, and may control the point in time of interruption of fuel injection of the engine 110. Also, in order to control engine stop, the hybrid control unit may transmit a torque command for control torque of the starter generator motor 120 to control collection of rotational energy of the engine. Furthermore, the hybrid control unit 240 may control a subordinate control unit configured to determine a mode switching condition and to perform mode switching at the time of controlling driving mode switching.

Of course, it will be apparent to those skilled in the art that the connection between the control units and functions/classification of the control units are illustrative and are not limited as to terms. For example, the hybrid control unit 240 may be implemented so as to provide the function of any one of the control units other than the hybrid control unit, or two or more of the other control units may provide the function of the hybrid control unit in a divided state.

"Unit" or "control unit" included in the names of the motor control unit (MCU) and the hybrid control unit (HCU) generally refer to a controller that controls a specific function of the vehicle and do not mean a generic function unit. For example, each control unit may include a communication device configured to communicate with another control unit or a sensor in order to control a function assigned thereto, a memory configured to store an operating system, logic commands, and input and output information, and at least one processor configured to perform determination, calculation, and decision necessary to control the assigned function.

The construction of FIGS. 5 and 6 is merely an example of the construction of the hybrid electric vehicle, and it will be apparent to those skilled in the art that the hybrid electric vehicle applicable to embodiments is not limited to the structure described above.

Hereinafter, catalyst heating (CH) control according to embodiments of the present disclosure will be described based on the construction of the hybrid electric vehicle.

In an embodiment of the present disclosure, in the hybrid electric vehicle, the point in time at which driving force of the engine is necessary is predicted, and catalyst heating is started based thereon. If prediction of the point in time at which driving force of the engine is necessary fails, the driving mode is differently controlled depending on whether entry is earlier than predicted or is later than predicted.

Figure 7:
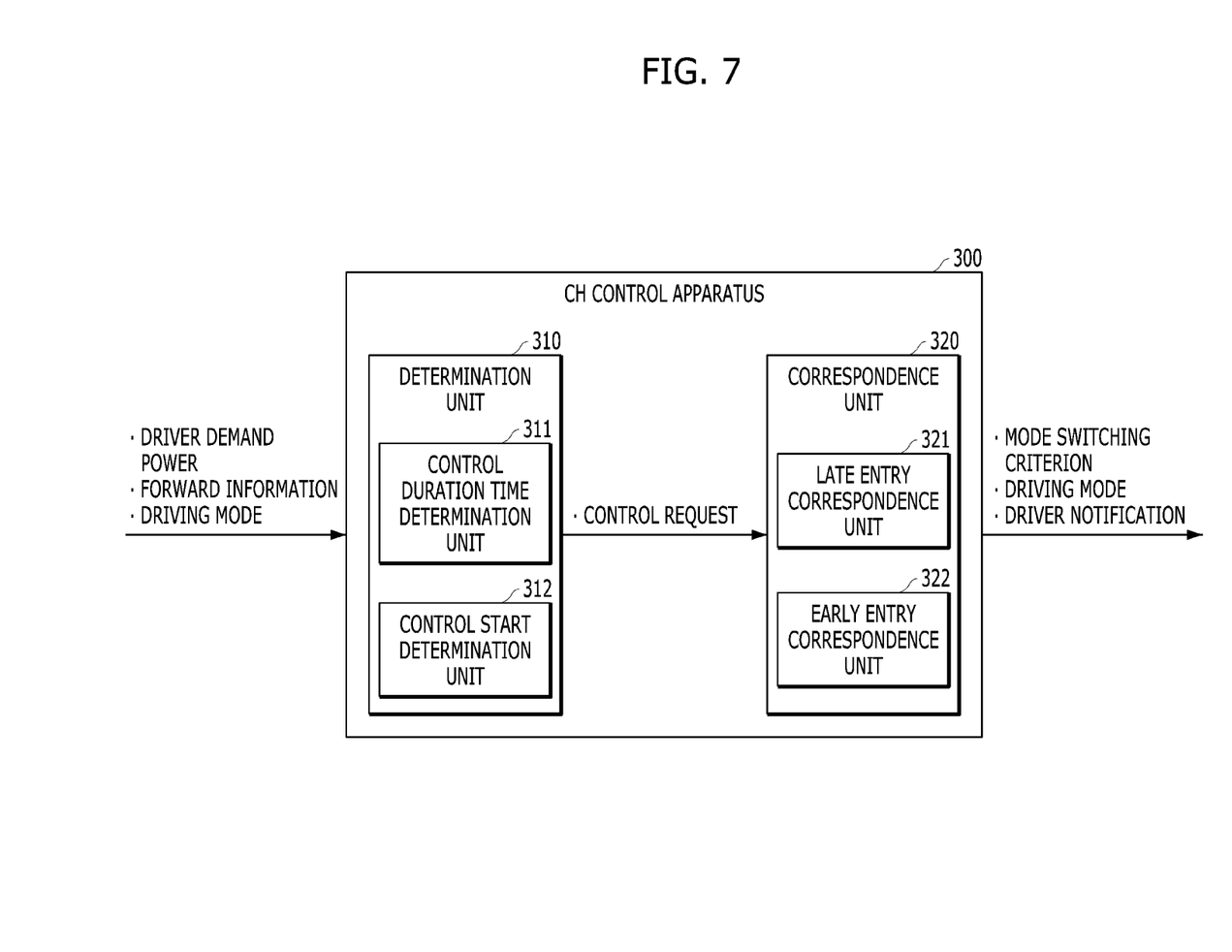
FIG. 7 shows an example of the construction of a catalyst heating control apparatus according to an embodiment of the present disclosure.

FIG. 7 shows an example of the construction of a catalyst heating control apparatus according to an embodiment of the present disclosure.

Referring to FIG. 7, the catalyst heating control apparatus 300 according to the embodiment may have driver demand power (or demand torque), forward information, and the current driving mode as input information, and may include a determination unit 310 and a correspondence unit 320.

The determination unit 310 may include a control duration time determination unit 311 and a control start determination unit 312, and the correspondence unit 320 may include a late entry correspondence unit 321 and an early entry correspondence unit 322.

Here, operation of each element of the catalyst heating control apparatus 300 will be described in more detail.

First, the control duration time determination unit 311 of the determination unit 310 may determine control duration time CH_time necessary until catalyst temperature increases to an activation zone. In general, the catalyst temperature is a value based on modeling, rather than a sensor value, and therefore the control duration time determination unit 311 may determine control duration time based on modeling of the catalyst temperature.

For example, the control duration time determination unit 311 may predict the current catalyst temperature based on the last point in time at which the engine is started based on predetermined catalyst temperature modeling logic and engine start time, and may determine control duration time necessary until the catalyst temperature reaches activation temperature when catalyst heating is performed after the engine is started in the series HEV mode. As another example, modeling may be performed with reference to engine coolant temperature in order to further increase accuracy.

The control start determination unit 312 may predict the possible maximum motor output in the EV mode based on the state of the drive motor 140 and the state of the battery (temperature or SOC), and may predict driver demand power after CH_time determined by the control duration time determination unit 311. That is, the control start determination unit 312 may predict the point in time of entry into the parallel HEV mode. If the driver demand power predicted after CH_time is greater than the possible maximum motor power in the EV mode, the control start determination unit 312 may transmit a control request for starting catalyst heating (CH) to the engine control unit 210. In addition, the control request for starting catalyst heating (CH) may also be transmitted to the correspondence unit 320.

Prediction of the driver demand power may be performed based on the current demand power change trend, or may be performed using forward information (the slope of a forward road, real-time traffic information, or a signal lamp). However, the present disclosure is not limited thereto.

Next, when actual entry into the parallel HEV mode is later than prediction (i.e., late entry), for example, when no demand power higher than the maximum motor output is generated even after the point in time of entry into the parallel HEV mode, predicted by the control start determination unit 312, the late entry correspondence unit 321 of the correspondence unit 320 may change determination criteria for entry into the parallel HEV mode. For example, the late entry correspondence unit 321 may change input speed of the transmission 150 (TM in RPM) to the minimum engine RPM at which engagement of the engine clutch 130 is possible and may change demand torque or demand power to a value lower than a default value, among the determination criteria for entry into the parallel HEV mode. In addition, upon predicting that demand power (or demand torque) higher than the maximum motor output will be generated within a predetermined time after the point in time of entry into the parallel HEV mode (i.e., the point in time of CH finish), predicted by the control start determination unit 312, the late entry correspondence unit 321 may maintain the series HEV mode even after CH finish. As a result, it is possible to prevent unnecessary on/off of the engine 110.

In addition, when actual entry into the parallel HEV mode is earlier than predicted (i.e., early entry), for example, when demand power higher than the maximum motor output is generated before the point in time of entry into the parallel HEV mode, determined by the control start determination unit 312, the early entry correspondence unit 322 may inhibit entry into the parallel HEV mode until catalyst heating (CH) control is completed. For example, when demand power (or demand torque) equal to or greater than the sum of the maximum motor output and a predetermined margin is generated, the early entry correspondence unit 322 may determine entry of the parallel HEV mode. In this case, however, demand power (or demand torque) between the maximum motor output and the sum of the maximum motor output and the margin may not be satisfied. Consequently, the early entry correspondence unit 322 may notify the driver that demand power may not be satisfied until CH_time is reached due to catalyst heating. A concrete configuration of control and notification through the margin will be described below with reference to FIGS. 9 and 10.

The catalyst heating control apparatus 300 may be implemented as a separate control unit or may be implemented as one function of the control unit that performs the functions assigned thereto. For example, the catalyst heating control apparatus 300 may be implemented as the hybrid control unit 240. However, this is illustrative, and therefore the present disclosure is not limited thereto.

A catalyst heating control process of the catalyst heating control apparatus 300 described above will be described with reference to the flowchart of FIG. 8.

Figure 8:
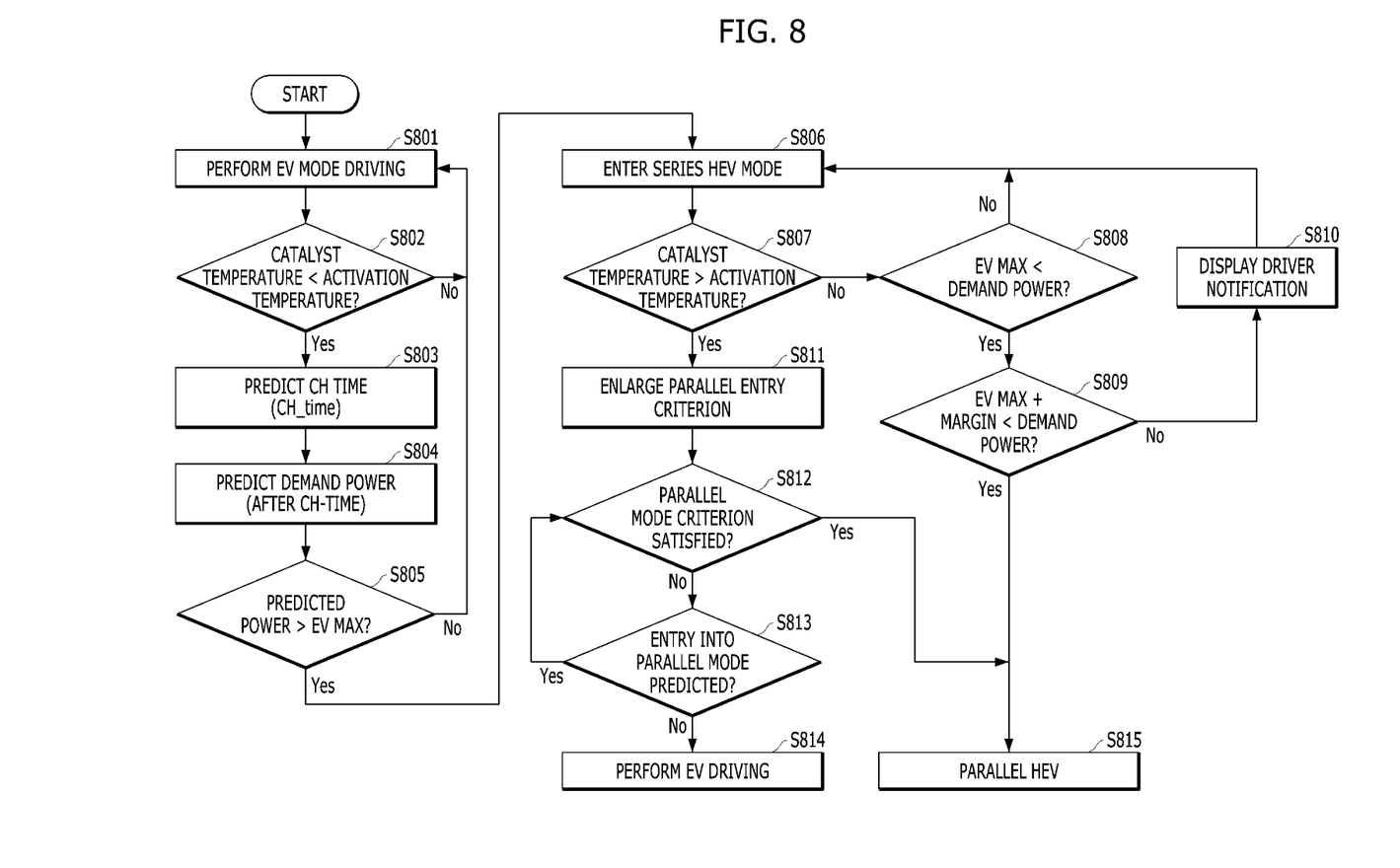
FIG. 8 is a flowchart showing an example of a catalyst heating control process according to an embodiment of the present disclosure.

FIG. 8 is a flowchart showing an example of a catalyst heating control process according to an embodiment of the present disclosure.

Referring to FIG. 8, when driving of the vehicle is started, driving in the EV mode may be performed (S801). When catalyst temperature is lower than activation temperature during driving in the EV mode (YES of S802), the determination unit 310 predicts time necessary for catalyst heating CH_time (S803).

In addition, the determination unit 310 predicts demand power after the lapse of CH_time (S804) and determines whether the predicted demand power exceeds the maximum motor output EV Max in the EV mode (S805). Upon determining that the demand power after the lapse of CH_time exceeds the maximum motor output EV Max (YES of S805), the determination unit 310 requests catalyst heating, and the vehicle starts catalyst heating through switching to the series HEV mode (S806).

When CH_time has not elapsed and the catalyst temperature is not higher than the activation temperature (NO of S807), the correspondence unit 320 may monitor the demand power for early entry correspondence (S808). When the demand power is not higher than the maximum motor output (NO of S808), catalyst heating may continue for CH_time in the series HEV mode. If demand power higher than the maximum motor output is generated (YES of S 808), the correspondence unit 320 may notify the drive that dissatisfaction of demand power may occur due to catalyst heating (S810) until the demand power is higher than the sum of the maximum motor output and a margin (NO of S809) in order to delay entry into the parallel HEV mode, and may continue catalyst heating. When the demand power exceeds the sum of the maximum motor output and the margin (YES of S809), by contrast, entry into the parallel HEV mode is allowed (S815).

Meanwhile, after the catalyst temperature exceeds the activation temperature due to the lapse of CH_time (YES of S807), which is a late entry situation, the correspondence unit 320 may change an entry criterion so as to be lowered in order to accelerate entry into the parallel HEV mode (S811).

When the demand power satisfies the lowered entry criterion (YES of S812), the correspondence unit 320 may allow entry into the parallel HEV mode (S815). When the demand power remains below the lowered entry criterion (NO of S812), the correspondence unit 320 may predict whether entry into the parallel HEV mode will occur within a predetermined time (S813). When entry into the parallel HEV mode within the predetermined time is predicted (YES of S813), the correspondence unit 320 may monitor the demand power while maintaining the series HEV mode (S812). When no entry into the parallel HEV mode within the predetermined time is predicted (NO of S813), by contrast, the correspondence unit 320 may determine switching to the EV mode (S814).

Figure 9:
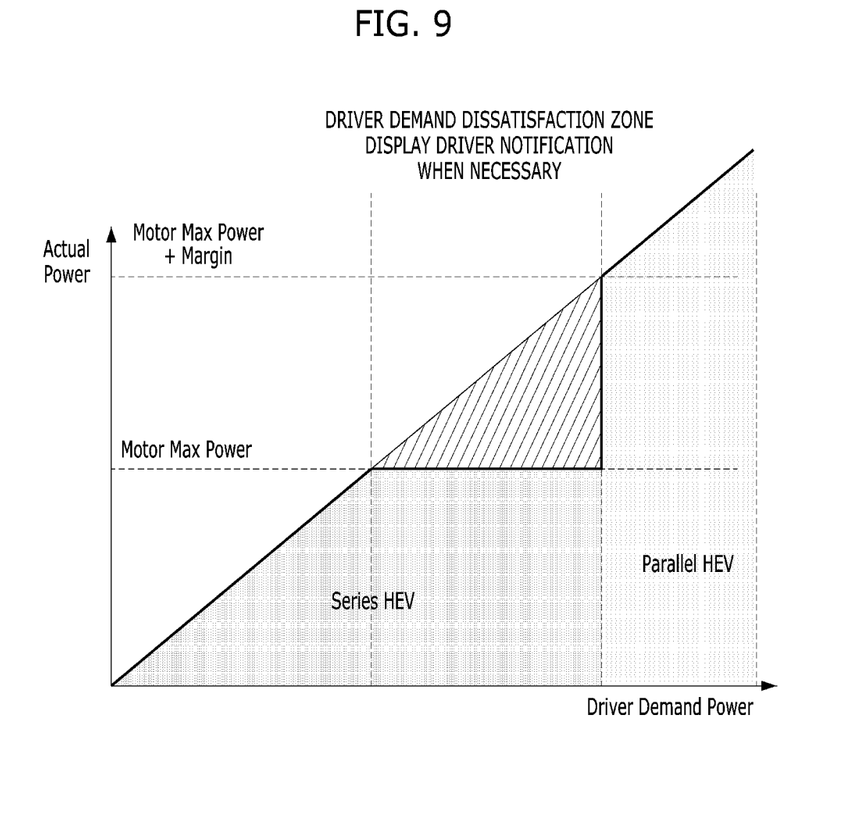
FIG. 9 shows an example of an output control configuration of an early entry correspondence unit according to an embodiment of the present disclosure.

FIG. 9 shows an example of an output control configuration of an early entry correspondence unit according to an embodiment of the present disclosure.

In the graph of FIG. 9, the horizontal axis indicates driver demand power and the vertical axis indicates actual output of a powertrain. Referring to FIG. 9, actual output corresponds to the demand power until the demand power reaches the maximum motor power. In a zone in which a predetermined margin is added to the maximum motor power after the demand power exceeds the maximum motor power, however, the actual output may be limited to the maximum motor power, and catalyst heating may be performed while the series HEV mode is maintained during execution of output limitation. If demand power greater than the sum of the maximum motor power and the predetermined margin occurs, switching to the parallel HEV mode and demand torque may be satisfied again.

Figure 10:
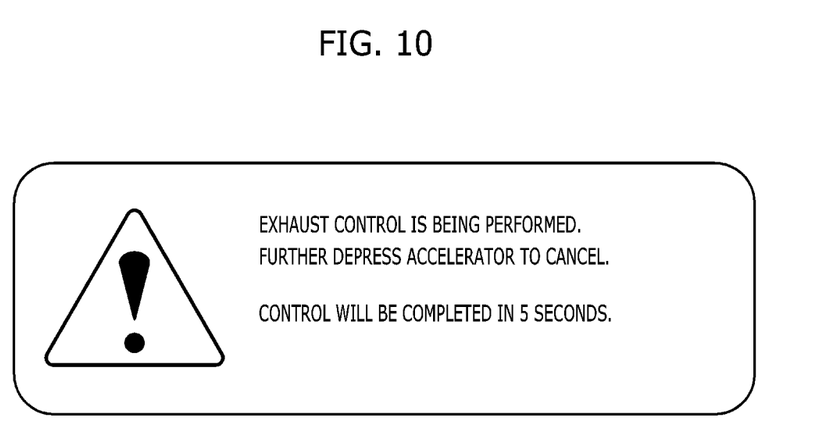
FIG. 10 shows an example of a driver notification display form according to an embodiment of the present disclosure.

FIG. 10 shows an example of a driver notification display form according to an embodiment of the present disclosure.

Referring to FIG. 10, during execution of output limitation, a display of the vehicle, e.g., at least one of a head-up display (HUD), a display of a cluster, and a display of an audio, video, and navigation (AVN) system, outputs visual guidance information indicating that demand torque dissatisfaction due to catalyst heating may occur. Time necessary until completion may be calculated as time elapsed after CH control is started from CH_time.

Figure 11:
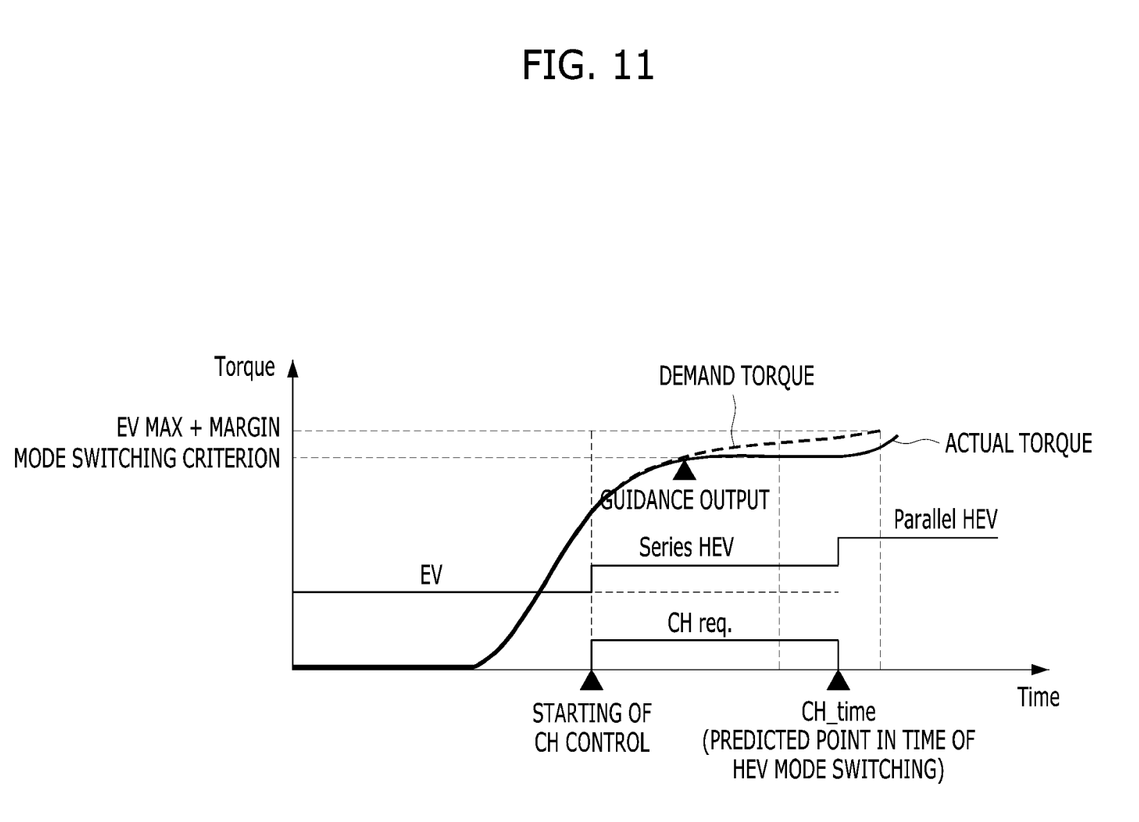
FIG. 11 is a view illustrating an effect of catalyst heating control according to an embodiment of the present disclosure.

FIG. 11 is a view illustrating an effect of catalyst heating control according to an embodiment of the present disclosure.

Referring to FIG. 11, the catalyst temperature is lower than the activation temperature during driving in the EV mode, whereby CH_time is determined, and catalyst heating control is started as a result of prediction that demand torque higher than the maximum motor torque will occur after CH_time. When the demand torque reaches the maximum motor torque (i.e., mode switching criterion) earlier than the predicted point in time of the HEV mode switching, however, switching to the parallel HEV mode is performed even though catalyst heating control is not finished in the conventional art, whereby a low-temperature catalyst use zone occurs. According to the embodiment, however, the series HEV mode is maintained together with output of guidance information until the demand torque is greater than the sum of the maximum motor torque and a margin and therefore switching to the parallel HEV mode is possible after catalyst heating is completed.

The present disclosure described above may be implemented as a computer-readable program stored in a computer-readable recording medium. The computer-readable medium may be any type of recording device in which data is stored in a computer-readable manner. The computer-readable medium may include, for example, a hard disk drive (HDD), a solid-state disk (SSD), a silicon disk drive (SDD), a read-only memory (ROM), a random access memory (RAM), a compact disc read-only memory (CD-ROM), a magnetic tape, a floppy disk, and an optical data storage device.

As is apparent from the above description, a hybrid electric vehicle related to at least one embodiment of the present disclosure is capable of predicting the point in time of entry into an HEV mode, thereby effectively determining the point in time of starting of catalyst heating control.

In addition, when the predicted point in time of entry into the HEV mode is different from an actual point in time of entry, it is possible to prevent unnecessary engine starting or repetitive engine starting by changing a mode entry criterion or inhibiting mode switching.

It will be appreciated by those skilled in the art that the effects achievable through the present disclosure are not limited to those that have been particularly described hereinabove and that other effects of the present disclosure will be more clearly understood from the above detailed description.

The above detailed description is not to be construed as limiting the present disclosure in any aspect, but is to be considered by way of example. The scope of the present disclosure should be determined by reasonable interpretation of the accompanying claims, and all equivalent modifications made without departing from the scope of the present disclosure should be understood as being included in the following claims.

What is claimed is:

1. A catalyst heating control method of a hybrid electric vehicle, the catalyst heating control method comprising:
   performing mode switching from a first mode in which only a drive motor is used as a driving source to a second mode in which an engine is driven in a state in which a drive shaft and the engine are disconnected from each other to start heating of a catalyst of the engine; and
   when demand torque higher than a maximum output of the drive motor occurs before the catalyst heating is completed, maintaining the second mode until the demand torque is greater than a sum of the maximum output and a predetermined margin.

2. The catalyst heating control method according to claim 1, further comprising:
   determining whether the catalyst heating is necessary before starting the catalyst heating; and
   determining a time necessary for the catalyst heating upon determining that the catalyst heating is necessary.

3. The catalyst heating control method according to claim 2, wherein the step of starting the catalyst heating is performed when a predicted value of demand power after lapse of the necessary time is greater than the maximum output of the drive motor.

4. The catalyst heating control method according to claim 1, wherein the step of maintaining the second mode comprises outputting notification information corresponding to dissatisfaction of the demand torque.

5. The catalyst heating control method according to claim 1, further comprising switching to a third mode in which the engine is used as the driving source when the demand torque is greater than the sum of the maximum output and the predetermined margin.

6. The catalyst heating control method according to claim 1, further comprising setting a criterion of entry into the third mode in which the engine is used as the driving source so as to be lowered when the catalyst heating is completed.

7. The catalyst heating control method according to claim 6, further comprising predicting whether entry into the third mode is performed within a predetermined time after the step of setting the entry criterion so as to be lowered.

8. The catalyst heating control method according to claim 7, further comprising maintaining the second mode upon predicting that entry into the third mode is performed within the predetermined time as a result of prediction.

9. The catalyst heating control method according to claim 7, further comprising switching to the first mode upon not predicting that entry into the third mode is performed within the predetermined time as a result of prediction.

10. A non-transitory computer-readable recording medium containing a-program instructions executed by a processor, the computer-readable recording medium comprising:
    program instructions that perform mode switching from a first mode in which only a drive motor is used as a driving source to a second mode in which an engine is driven in a state in which a drive shaft and the engine are disconnected from each other to start heating of a catalyst of the engine; and
    when demand torque higher than a maximum output of the drive motor occurs before the catalyst heating is completed, program instructions that maintain the second mode until the demand torque is greater than a sum of the maximum output and a predetermined margin.

11. A hybrid electric vehicle comprising:
    a drive motor;
    an engine; and
    a control unit configured to perform control such that mode switching is performed from a first mode in which only the drive motor is used as a driving source to a second mode in which the engine is driven in a state in which a drive shaft and the engine are disconnected from each other to start heating of a catalyst of the engine and, when demand torque higher than a maximum output of the drive motor occurs before the catalyst heating is completed, the second mode is maintained until the demand torque is greater than a sum of the maximum output and a predetermined margin.

12. The hybrid electric vehicle according to claim 11, wherein the control unit determines whether the catalyst heating is necessary before starting the catalyst heating and determines a time necessary for the catalyst heating upon determining that the catalyst heating is necessary.

13. The hybrid electric vehicle according to claim 12, wherein the control unit performs control such that the catalyst heating is started when a predicted value of demand power after lapse of the necessary time is greater than the maximum output of the drive motor.

14. The hybrid electric vehicle according to claim 11, wherein the control unit performs control such that notification information corresponding to dissatisfaction of the demand torque is output upon determining that the second mode is maintained.

15. The hybrid electric vehicle according to claim 11, wherein the control unit determines switching to a third mode in which the engine is used as the driving source when the demand torque is greater than the sum of the maximum output and the predetermined margin.

16. The hybrid electric vehicle according to claim 11, wherein the control unit sets a criterion of entry into the third mode in which the engine is used as the driving source so as to be lowered when the catalyst heating is completed.

17. The hybrid electric vehicle according to claim 16, wherein the control unit predicts whether entry into the third mode is performed within a predetermined time after the entry criterion is set so as to be lowered.

18. The hybrid electric vehicle according to claim 17, wherein the control unit maintains the second mode upon predicting that entry into the third mode is performed within the predetermined time as a result of prediction.

19. The hybrid electric vehicle according to claim 17, wherein the control unit determines switching to the first mode upon not predicting that entry into the third mode is performed within the predetermined time as a result of prediction.

* * * * *